Jan. 17, 1933.  P. SCHLUMBOHM  1,894,639

MIRROR

Filed June 26, 1931

Inventor:
Peter Schlumbohm
by Adolph A. Thomas
Attorney

Patented Jan. 17, 1933

1,894,639

UNITED STATES PATENT OFFICE

PETER SCHLUMBOHM, OF BERLIN, GERMANY, ASSIGNOR TO THE AMERICAN THERMOS BOTTLE COMPANY, OF NORWICH, CONNECTICUT, A CORPORATION OF OHIO

MIRROR

Application filed June 26, 1931, Serial No. 547,055, and in Germany March 23, 1931.

This invention is for a novel hand mirror adapted to be used in conjunction with a suitable source of light to illuminate the parts viewed therein, particularly the interior of the mouth. For this purpose I provide the mirror with a lens which concentrates the light coming from behind the mirror and directs the converging light pencil to the desired spot. To prevent the light from striking the eyes, the mirror is formed with a flaring rim which shields the eyes and yet allows a clear view of the illuminated part in the mirror. The lens is an integral part of the glass body of the mirror, and the reflecting surface is a flat ring-shaped member surrounding the lens. The edge of the mirror is shaped to form a convenient and safe grip for the fingers. The device is very simple and cheap to make.

In the accompanying drawing, which illustrates one embodiment of my invention—

Figure 1:
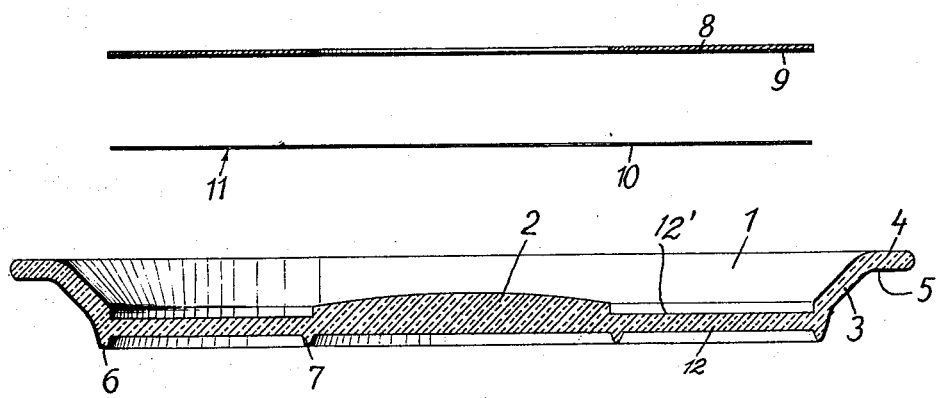
Fig. 1 shows a diametric cross-section of the mirror parts prior to assembling.
Figure 2:
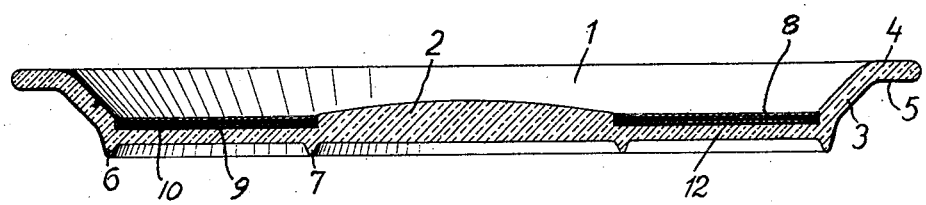
Fig. 2 is a cross-section of the complete mirror.
Figure 3:
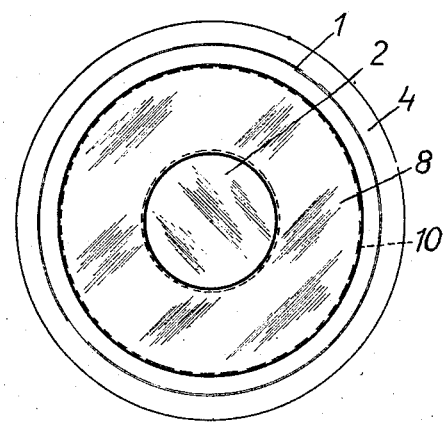
Figs. 3 and 4 are front and back views, respectively, on a reduced scale.
Figure 4:
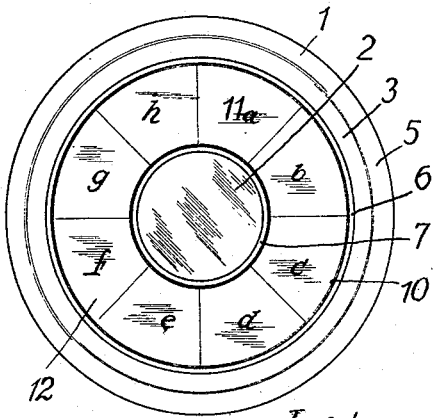

A single piece of pressed or molded glass 1 is formed at the center with an integral lens 2 adapted to concentrate light rays from a lamp behind the mirror. The glass member 1 has a flaring or conical rim 3 which terminates in an annular flange 4, and these two parts are coated on the back side with an opaque layer 5. It may be desirable to sandblast or otherwise roughen the glass before the layer 5 is applied. The bottom plate 12 of member 1 may have circular ribs 6 and 7 on which the mirror rests. The outer rib 6 also serves to cooperate with rim members 3 and 4 to form a safe finger grip, and the inner rib 7 protects the lens 2.

A flat ring 8 of glass or other transparent material is provided on its underside with a mirror coating 9, and this ring is placed over a sheet 10 of paper or the like in the recess 12′ surrounding the lens 2. The sheet 10 may first be glued or cemented to the bottom plate 12, and then the mirror 8—9 is glued to the sheet, which is thereby protected against moisture. Any other practical means may be employed for attaching the mirror 8—9 to plate 12. The back side of sheet 10 may carry pictures 11a—h which are clearly readable through the glass plate 12, and at the same time they are protected against injury. These pictures, for example, may contain instructions and diagrams concerning the care of the teeth or other parts of the body. The lens 2 is of sufficient diameter to illuminate the desired part, and the opaque flaring rim 3—4 keeps the light out of the eyes, so that a person clearly sees the illuminated part in the annular mirror 8. By way of example, I may suggest a lens of about 6 cm. diameter and 30 cm. focus.

Although I have shown and described a specific structure, my invention is not limited to the exact details set forth. Changes and modifications may be resorted to without departing from the scope of the invention as defined in the appended claims.

I claim as my invention:

1. A hand mirror comprising a glass plate formed with an integral lens for concentrating light from behind the mirror on the desired part, a marginal flange on said plate, said lens projecting above the top surface of said plate and cooperating with said flange to form an annular recess surrounding the lens, and a mirror element separate from the plate mounted in said recess around the lens.

2. A hand mirror comprising a glass plate formed with an integral lens for concentrating light from behind the mirror on the desired part, an annular mirror element mounted on said plate and surrounding said lens, and an opaque rim integral with said plate adapted to shield the eyes of the user while permitting a clear view of the illuminated part in the mirror.

3. A hand mirror comprising a glass plate formed with an integral lens for concentrating light from behind the mirror on the desired part, said lens projecting above the top surface of said plate and forming an annular recess, a mirror element mounted in said recess around the lens, and an opaque rim integral with said plate adapted to shield the eyes of the user while permitting a clear view of the illuminated part in the mirror.

4. A hand mirror comprising a glass plate formed with an integral lens for concentrating light from behind the mirror on the desired part, an annular mirror element mounted on said plate and surrounding said lens, and an opaque rim integral with said plate adapted to shield the eyes of the user while permitting a clear view of the illuminated part in the mirror, said rim being conical and terminating in a flange adapted to act as a finger grip.

5. A hand mirror comprising a glass plate formed with an integral lens for concentrating light from behind the mirror on the desired part, an annular mirror element mounted on said plate and surrounding said lens, an opaque rim integral with said plate adapted to shield the eyes of the user while permitting a clear view of the illuminated part in the mirror, and a pair of concentric integral ribs on the bottom side of said plate, the inner rib surrounding the lens and the outer rib forming a projection of said rim, whereby said rim and outer rib cooperate to form a finger grip.

6. A hand mirror comprising a glass plate provided with an integral lens for concentrating light from behind the mirror on an object in front of the mirror, a mirror element surrounding said lens, and an opaque rim extending forwardly from the plate to shade the mirror and to shield the eyes of the user from the light behind the mirror.

7. A hand mirror comprising a glass plate provided with an integral lens for concentrating light from behind the mirror on an object in front of the mirror, a mirror element surrounding said lens, and an outwardly flared opaque rim extending forwardly from the plate to shade the mirror and to shield the eyes of the user from the light behind the mirror.

PETER SCHLUMBOHM.